United States Patent
Wolber et al.

(10) Patent No.: US 7,543,575 B2
(45) Date of Patent: Jun. 9, 2009

(54) FUEL SYSTEM FOR AN INTERNAL COMBUSTION ENGINE

(75) Inventors: Jens Wolber, Gerlingen (DE); Christian Koehler, Erligheim (DE); Laurent Nack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/950,697

(22) Filed: Dec. 5, 2007

(65) Prior Publication Data

US 2008/0149076 A1 Jun. 26, 2008

(30) Foreign Application Priority Data

Dec. 20, 2006 (DE) .................. 10 2006 060 300

(51) Int. Cl.
*F02M 15/04* (2006.01)
*F02G 5/00* (2006.01)

(52) U.S. Cl. ...................... 123/557; 123/549

(58) Field of Classification Search ............. 123/557, 123/549, 552, 456, 497, 463, 464; 701/102; 219/205

See application file for complete search history.

(56) References Cited

U.S. PATENT DOCUMENTS

| | | | | |
|---|---|---|---|---|
| 2,346,506 A * | 4/1944 | Pulliam | ...................... | 219/205 |
| 2,747,555 A * | 5/1956 | Brunner | ...................... | 123/445 |
| 4,187,813 A * | 2/1980 | Stumpp | ...................... | 123/510 |
| 4,377,149 A * | 3/1983 | Naylor et al. | ............... | 123/557 |
| 4,397,287 A * | 8/1983 | Pierard | ...................... | 123/557 |
| 4,440,138 A * | 4/1984 | Smith | ...................... | 123/557 |
| 4,454,851 A * | 6/1984 | Bourbonnaud et al. | ...... | 123/557 |
| 4,625,701 A * | 12/1986 | Bartlett et al. | ............... | 123/514 |
| 4,665,881 A * | 5/1987 | Wade | ...................... | 123/557 |
| 4,841,943 A * | 6/1989 | Favreau et al. | ............... | 123/557 |
| 4,850,327 A * | 7/1989 | Fayard | ...................... | 123/557 |
| 6,615,806 B2 * | 9/2003 | Schueler | ...................... | 123/514 |
| 6,837,225 B1 * | 1/2005 | Fukuda | ...................... | 123/552 |
| 6,839,508 B2 * | 1/2005 | Biess et al. | ............... | 392/462 |
| 2003/0034010 A1 * | 2/2003 | Kellner et al. | ............... | 123/446 |

* cited by examiner

*Primary Examiner*—Mahmoud Gimie
(74) *Attorney, Agent, or Firm*—Ronald E. Greigg

(57) ABSTRACT

A fuel system for an internal combustion engine includes a delivery unit and a pressure region into which the delivery unit feeds; the fuel system includes at least one heater and a control unit, which activates the heater when the delivery unit is switched off so that the pressure in the pressure region does not fall below a limit pressure.

20 Claims, 3 Drawing Sheets

FUEL SYSTEM FOR AN INTERNAL COMBUSTION ENGINE

REFERENCE TO FOREIGN PATENT APPLICATION

This application is based on German Patent Application No. 10 2006 060 300.1 filed 20 Dec. 2006, upon which priority is claimed.

BACKGROUND OF THE INVENTION

1. Field of the Invention

The invention relates to an improved fuel system for an internal combustion engine.

2. Description of the Prior Art

In conventional motor vehicles with gasoline direct injection, the fuel system is embodied so that after the engine is switched off, the fuel pressure continues to be maintained for a period of time. Only through cooling of the engine and fuel system and through leakage into the tank does the pressure in the fuel system slowly decrease. The gradient of the pressure decrease and therefore its duration depend on various boundary conditions and are not possible to calculate.

For reducing emissions when starting the internal combustion engine and for improving starting times and starting quality (dispersion), the pressure in the fuel system, in particular in the high-pressure system, should be as high as possible already prior to the first injection. In that case, it is specifically possible to already reduce the first injection during the compression stroke, thus requiring clearly less fuel, which, in turn, results in reduced emissions. This is referred to as "high-pressure starting."

OBJECT AND SUMMARY OF THE INVENTION

The object of the present invention is to create a fuel system that permits such a high-pressure start reliably and with simple means.

This object is attained by a fuel system according to the invention in which after both the engine and the delivery unit are switched off, at least part of the fuel cools down to such an extent that the pressure in the pressure region falls below a limit pressure. This limit pressure, possibly with the inclusion of certain tolerances, is a pressure below which gas bubbles can form in the pressure system. The limit pressure can be equal to the ambient pressure, but it can also be derived from the vapor pressure curve and under some circumstances, can be identical to the vapor pressure. The ambient pressure is particularly relevant if the formation of air bubbles is to be prevented, while the vapor pressure is particularly relevant if the formation of vapor bubbles (gaseous fuel) is to be prevented. Air bubbles, however, are more critical since they only return to solution relatively slowly in comparison to vapor bubbles.

The fuel system according to the invention thus prevents such a formation of air bubbles or gas bubbles. It is therefore possible to achieve a "cold" high-pressure start with reproducibly short starting times. The maintenance of pressure in the fuel system also yields an improved hot starting process since here, too, the formation of vapor bubbles is prevented.

In a preferred embodiment of the fuel system according to the invention, the system includes a low-pressure region and a high-pressure region, with at least one heater provided in the low-pressure region, preferably in the inlet to a high-pressure pump. This is comparatively simple to implement from a technical standpoint since the low-pressure region is usually situated somewhat farther away from the engine and is therefore more easily accessible. Also, the low-pressure region is as a rule cooler than the high-pressure region. In addition, a cyclical activation of the heater situated in the low-pressure region enables implementation of a kind of "thermal pump," which pumps the fuel into the high-pressure region, thus making it possible to continuously keep the pressure therein at a level above the limit pressure. This is based on the consideration that, situated between the low-pressure region and the high-pressure region, there is usually a high-pressure pump with a corresponding check valve whose opening pressure is exceeded by the pressure increase that the operation of the heater produces in the low-pressure region so that fuel is pushed from the low-pressure region into the high-pressure region. This reduces the total heater activation time required to prevent the pressure in the high-pressure region from falling below the limit pressure.

Basically, however, it is also possible for the heater to be situated in the high-pressure region, preferably at a fuel rail. This has the advantage that the heater produces a pressure increase in precisely the region in which the high pressure is required for the implementation of a high-pressure start.

A simple technical implementation of such a heater can be composed of an electric heating wire.

A cyclical activation of the heater reduces the energy consumption.

In a particularly advantageous embodiment of the fuel system according to the invention, the control unit is embodied so that at least one activation parameter of the heater, in particular an activation time, a duration until a first activation, an activation duration, a pause time between two activated phases, and/or a heating capacity, depends at least some of the time on at least one operating variable of the fuel system, in particular the signal of a fuel pressure sensor and/or temperature sensor, a modeled fuel pressure, and/or a modeled temperature. In this way, the operation of the heater is reduced to a minimum amount, thus lessening the burden on an electrical system of the fuel system and/or of the engine. This step can also extend the service life of the heater and reliably assures that the pressure in the pressure region will not fall below the limit pressure.

In this connection, it possible for the control unit to be embodied so that an activation parameter is determined at or immediately after the switching off of the delivery unit and/or engine. The switching off of the delivery unit and/or engine is a time at which it is already possible to estimate with a favorable degree of precision how the temperature and therefore also the pressure develop in the fuel system. In this modification, it is possible to prevent an unnecessary activation of the control unit and the accompanying power consumption.

Alternatively to this, it is possible for the control unit to be embodied so that the activation parameter is determined before or at the starting of the delivery unit and/or the engine. This likewise lessens the burden on the electrical system since the determination of the activation parameter is carried out only in those cases in which a starting of the delivery unit or engine is imminent or is currently occurring.

It is also possible, however, for the control unit to be embodied so that at least one operating variable of the fuel system, in particular a pressure, a temperature, or a corresponding variable, is compared to a limit value and the activation parameter is determined and/or an actuation is carried out as a function of the comparison result. This is easy to implement by means of programming.

The comparison can be carried out at predetermined intervals. To this end, a timer wakes the control unit from a sleep state, which is technically simple and therefore inexpensive.

It is also possible, however, to vary the intervals by making them dependent on at least one operating variable of the fuel system. This can be an operating variable that is determined when the delivery unit and/or the engine is switched off, but can also be an operating variable that is continuously determined and evaluated.

According to a particularly simple embodiment of the fuel system according to the invention, the control unit is embodied so that at least one activation parameter of the heater, in particular an activation time, a duration until a first activation, an activation duration, a pause time between two activated phases, and/or a heating capacity, is preset in a fixed fashion.

It is also useful for the control unit to be integrated into a device separate from an engine management system. This, too, can lessen the burden on the electrical system in that the heater is activated by a control unit that has a particularly low power consumption, particularly in a sleep state.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
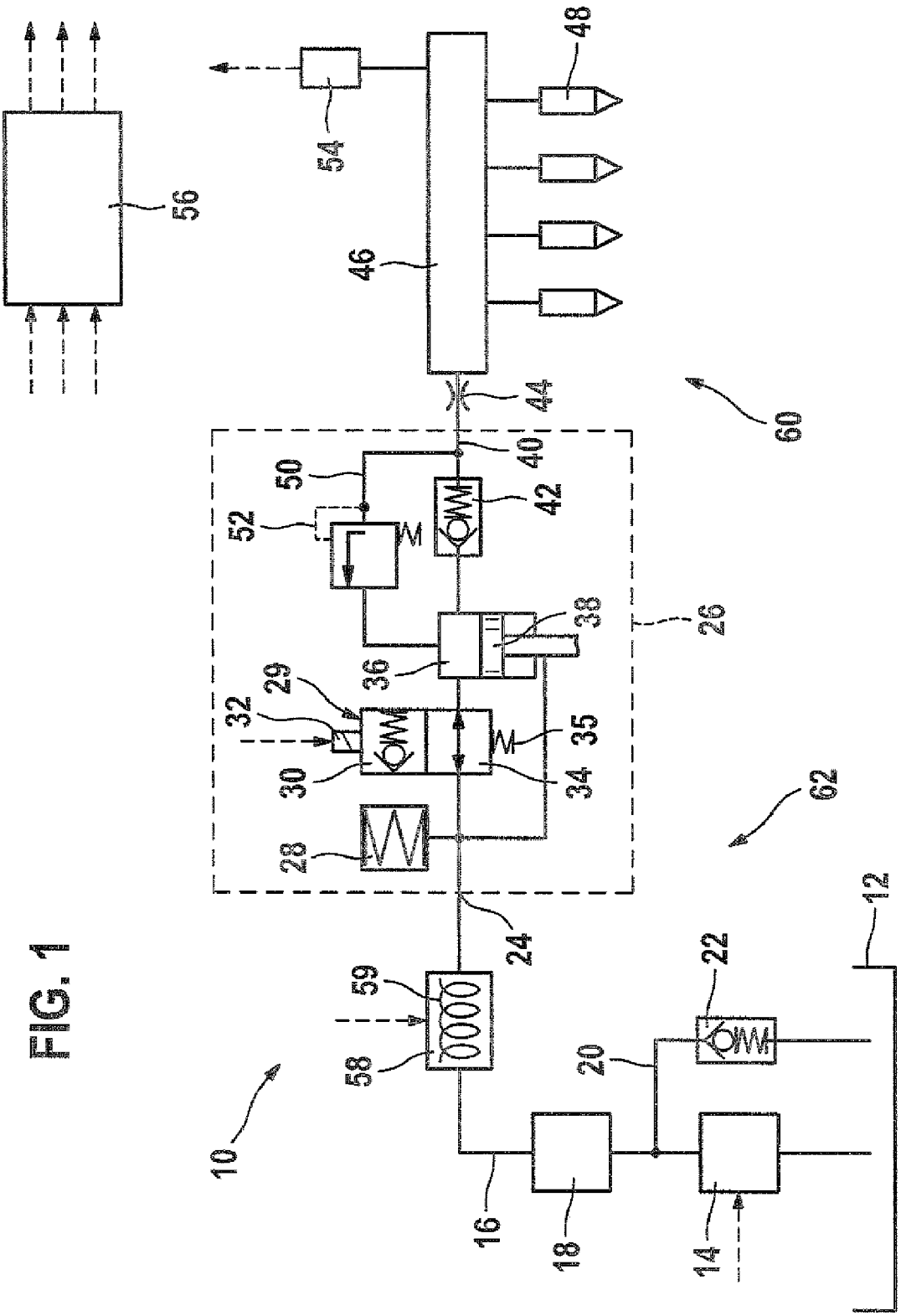
FIG. 1 is a schematic depiction of a fuel system of an internal combustion engine embodying the invention.

In FIG. 1, a fuel system is labeled with the reference numeral 10. It includes a fuel tank 12 from which an electric fuel pump 14 feeds the fuel into a low-pressure line 16 that contains a fuel filter 18. Between the electric fuel pump 14 and the fuel filter 18, a return line 20 that contains a pressure relief valve 22 branches off from the low-pressure line 16 and leads back to the fuel tank 12.

The low-pressure line 16 leads to an inlet 24 of a high-pressure pump unit 26. Downstream of the inlet 24, this high-pressure pump unit 26 includes a relatively low-volume pressure damper 28, followed by a quantity control valve 29, which in one position, functions as an inlet check valve 30. It is brought into this position by an electromagnetic actuator 32, whereas a spring 35 acts on it in the direction of the other position, namely the continuously open position 34. Further downstream of the inlet valve 30 is a delivery chamber 36 that is delimited by a piston 38. The high-pressure pump unit 26 thus includes a piston pump.

From the delivery chamber 36, a high-pressure line 40 leads via an outlet valve 42 and the throttle 44 to a fuel rail 46. Connected to the latter, there are number of fuel injectors 48 that inject the fuel directly into the associated combustion chambers (not shown) of an internal combustion engine to which the fuel system 10 belongs. A relief line 50 that contains the pressure relief valve 52 branches off from the high-pressure line 40 and leads back to the delivery chamber 36. The pressure prevailing in the fuel rail 46 is detected by a pressure sensor 54. Its signal is conveyed to different control and regulating devices, among others, a control unit 56. This control unit 56 is a separate unit from the control unit that controls and regulates the operation of the internal combustion engine. Among other things, the control unit 56 activates a heater 58 that includes a heating wire 59 and is situated in the low-pressure line between the fuel filter 18 and the inlet 24 of the high-pressure pump unit 26.

During normal operation of the fuel system 10, the fuel pump 14 compresses the fuel to a pre-delivery pressure, usually 4 to 6 bar, that prevails in the low-pressure line 16. In the delivery chamber 36 of the high-pressure pump unit 26, this pre-compressed fuel is compressed further to a very high pressure, usually a few hundred bar, and is stored at this pressure in the fuel rail 46.

The delivery of fuel by the two delivery units, namely the electric fuel pump 14 and the high-pressure pump unit 26, is stopped after the engine is switched off. In the case of the high-pressure pump unit 26, this occurs in compulsory fashion since the piston 38 is mechanically driven by the engine. In particular, the fuel rail 46 and the high-pressure pump unit 26 have a particularly good thermal connection to the internal combustion engine. During normal operation of the engine, these components, which can be associated, in very general terms, with a so-called "high-pressure region" of the fuel system 10, which region is labeled 60, are at a relatively high temperature. Thermal conduction, however, also causes a warming of the low-pressure line 16, which can be associated with a so-called "low-pressure region" 62.

After the engine and fuel system 10 are switched off, the spring 35 moves the quantity control valve 29 into the open position 34. In this state, the low-pressure region 62 also includes the delivery chamber 36 and the region of the high-pressure line 40 extending from the delivery chamber 36 to the outlet valve 42. This low-pressure region 62 is a closed system that encloses the fuel at a relatively low pressure. Correspondingly, after the fuel system 10 is switched off, only the region of the high-pressure line 40 extending from the outlet valve 42 to the fuel rail 46 and the fuel rail 46 itself belong to the high-pressure region 60, which then likewise comprises a closed system that encloses the fuel at a certain pressure that is somewhat higher than the pressure in the low-pressure region 62.

After the fuel system 10 is switched of, the low-pressure region 62, the high-pressure region 60, and the enclosed fuel have an elevated temperature that gradually decreases. The decrease in temperature reduces the volume of the enclosed fuel, thus also reducing the pressure. If corresponding countermeasures are not taken, the pressure, particularly in the high-pressure region 60, can drop below a limit pressure, for example the ambient pressure. This would result in the formation of air bubbles in the high-pressure region 60, which, when the engine was restarted, would first have to be compressed before a new pressure build-up could occur. For emissions reasons, however, it is desirable to have the highest possible pressure in the pressure rail 46 right at the beginning of a new start of the engine because only then is the fuel sufficiently atomized by the fuel injectors 48 for the injection to be able to occur during the compression stroke. This is advantageous because then, a comparatively small fuel quantity suffices for starting the engine and as a result, a comparatively complete combustion of the fuel occurs.

When the fuel system 10 cools, in order to prevent the formation of air bubbles, particularly in the high-pressure region 60 but also in the low-pressure region 62, the fuel system shown in FIG. 1 is provided with the heater 58. During the time that the fuel system 10 is turned off, i.e. when the electric fuel pump 14 and high-pressure pump unit 26 are deactivated, this heater 58 is switched on from time to time in a way that will be described in greater detail below. The associated temperature increase of the enclosed fuel causes it to expand again, which results in a corresponding pressure increase in the closed low-pressure region 62. As soon as the pressure difference between the low-pressure region 62 and the high-pressure region 60 has exceeded that required for an opening of the outlet valve 42, the outlet valve 42 opens and the pressure increase in the low-pressure region 62 that has been produced by the heater 58 is transferred into the high-pressure region 60.

If the heater 58 is switched off again, then the fuel in the low-pressure region 62 and also in the high-pressure region 60 cools down again. But then the outlet valve 42 closes again to prevent fuel from the high-pressure region 60 from flowing back into the low-pressure region 62. If the pressure in the low-pressure region 62 falls below a certain pressure level, approximately the ambient pressure or somewhat higher in order to prevent the formation of air bubbles, the corresponding inlet valve of fuel pump 14, which valve is not shown in FIG. 1, opens so that fuel flows out of the fuel tank 12 into the low-pressure region 62. This process can be repeated in a cyclical fashion. Through a cyclical operation of the heater 58, fuel is thus "pumped" from the low-pressure region 62 into the high-pressure region 60 and despite the overall decrease in temperature, the pressure in the high-pressure region 60 is kept at a level that is sufficient to prevent the formation of air bubbles.

FIG. 2 shows the curves of certain operating variables of the fuel system 10 during execution of the method described above: at the very top in FIG. 2, an activation voltage U with which the heater 58 is activated by the control unit 56 is plotted over time t. In the second graph from the top, a pressure prevailing in the low-pressure region 62 is plotted over time t, and below that, the curve of a temperature of the fuel enclosed in the low-pressure region 62. The second graph from the bottom depicts the curve of the pressure prevailing in the high-pressure region 60, and the bottom graph shows the corresponding temperature prevailing in the high-pressure region 60.

Figure 2:
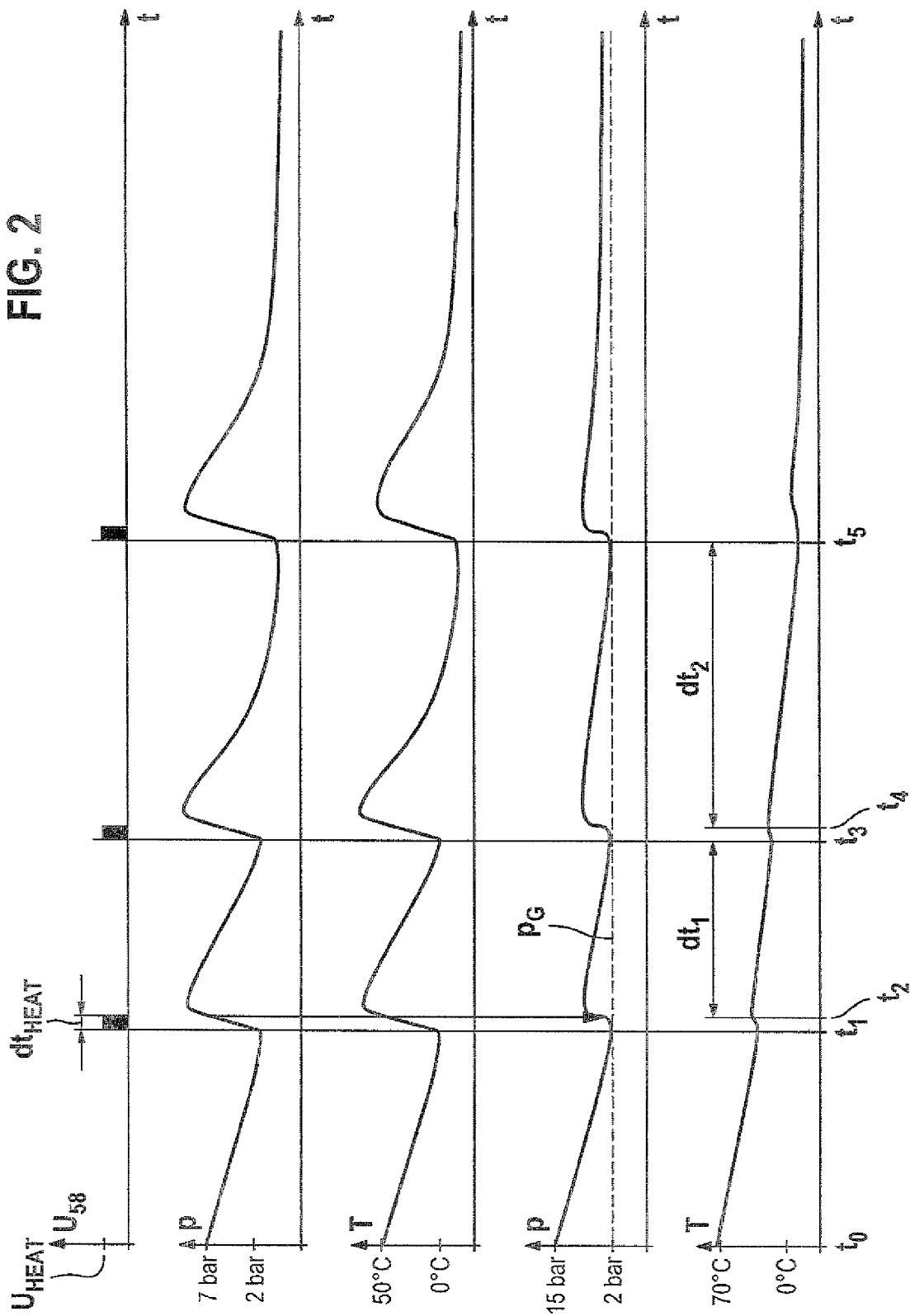
FIG. 2 shows various graphs in which operating variables such as pressure and temperature in the fuel system of FIG. 1 are plotted over the time after the switching off of a delivery unit.

The deactivation time of the fuel system 10—at which the solenoid control valve 29 is also opened—is labeled $t_0$ in FIG. 2. At this time in the current exemplary embodiment, a pressure of 7 bar prevails in the low-pressure region 62 while a pressure of 15 bar prevails in the high pressure region 60. The temperature in the low-pressure region 62 is approximately 50° C., while the temperature in the high-pressure region 60 is approximately 70° C.

It is clear that now, the temperatures and pressures decrease slowly. As soon as a limit pressure (e.g. 2 bar and thus in any case somewhat higher than the ambient pressure) is reached in the high-pressure region 60, which is the case at time $t_1$ in FIG. 2, the control unit 56 activates or switches on the heater 58 with an activation voltage $U_{HEAT}$ during a certain comparatively short interval $dt_{HEAT}$. This causes the temperature of the fuel enclosed in the low-pressure region 62 to increase as a result of which the accompanying volume expansion also causes the pressure to correspondingly rise.

If the pressure difference between the low-pressure region 62 and the high-pressure region 60 reaches the pressure difference required for an opening of the outlet valve 42, which is the case at time $t_2$, then the outlet valve 42 opens so that the pressure in the high-pressure region 60 also increases. A certain increase in the temperature in the high-pressure region 60 is also discernible, but this is comparatively low.

After the end of the activation interval $dt_{HEAT}$, the fuel in the low-pressure region 62 cools down again, thus once again resulting in a drop in the pressure in this region. The high-pressure region 60 also continues to cool so that here, too, the pressure decreases again. If the pressure in the high-pressure region 60 once again reaches the limit pressure $p_G$, which is the case at time $t_3$, the control unit 56 once again activates the heater 58 so that the temperature in the low-pressure region 62 increases and therefore so does the pressure prevailing in the low-pressure region 62. As soon as the pressure difference at the outlet valve 42 is once again sufficient to open the valve, which is the case at time $t_4$, the pressure in the high-pressure region 60 also increases.

It is clear that the pressure increase in the high-pressure region 60 occurs only in a delayed fashion after the heater 58 is switched on. In order to reliably prevent the formation of air bubbles in the high-pressure region 60, the limit pressure of approximately 2 bar is somewhat higher than the ambient pressure (approximately 1 bar). If vapor bubbles are to be reliably prevented, then the limit pressure would have to be somewhat higher than the vapor pressure of the fuel in the high-pressure region 60. Since the vapor pressure decreases as the temperature decreases, in lieu of a constant limit pressure $p_G$, it is also possible to use a limit pressure that decreases with time t.

In this second heating cycle as well, fuel is finally "pumped" from the low-pressure region 62 into the high-pressure region 60. The gradient at which the pressure decreases after the second activation phase of the heater 58 is therefore lower than the preceding time. The interval $dt_2$ that is required before the next activation of the heater 58 at time $t_4$ is therefore greater than the pause time $dt_1$ in the preceding cycle.

It is clear from FIG. 2 that the activation duration $dt_{HEAT}$, which is an activation parameter of the heater 58, is independent of the signal of the pressure sensor 54 that detects the pressure in the high-pressure region 60, i.e. is preset in a fixed fashion.

It is also essentially conceivable, however, for activation parameters of the heater 58, for example the activation duration $dt_{HEAT}$, particularly the duration $t_1$ until the first activation, as well as the heating capacity and activation voltage, to depend on the fuel pressure and/or the temperature in the high pressure region 60 or the temperature in the low pressure region 62. It is also possible to use modeled values for determining the activation parameters of the heater 58.

Figure 3:
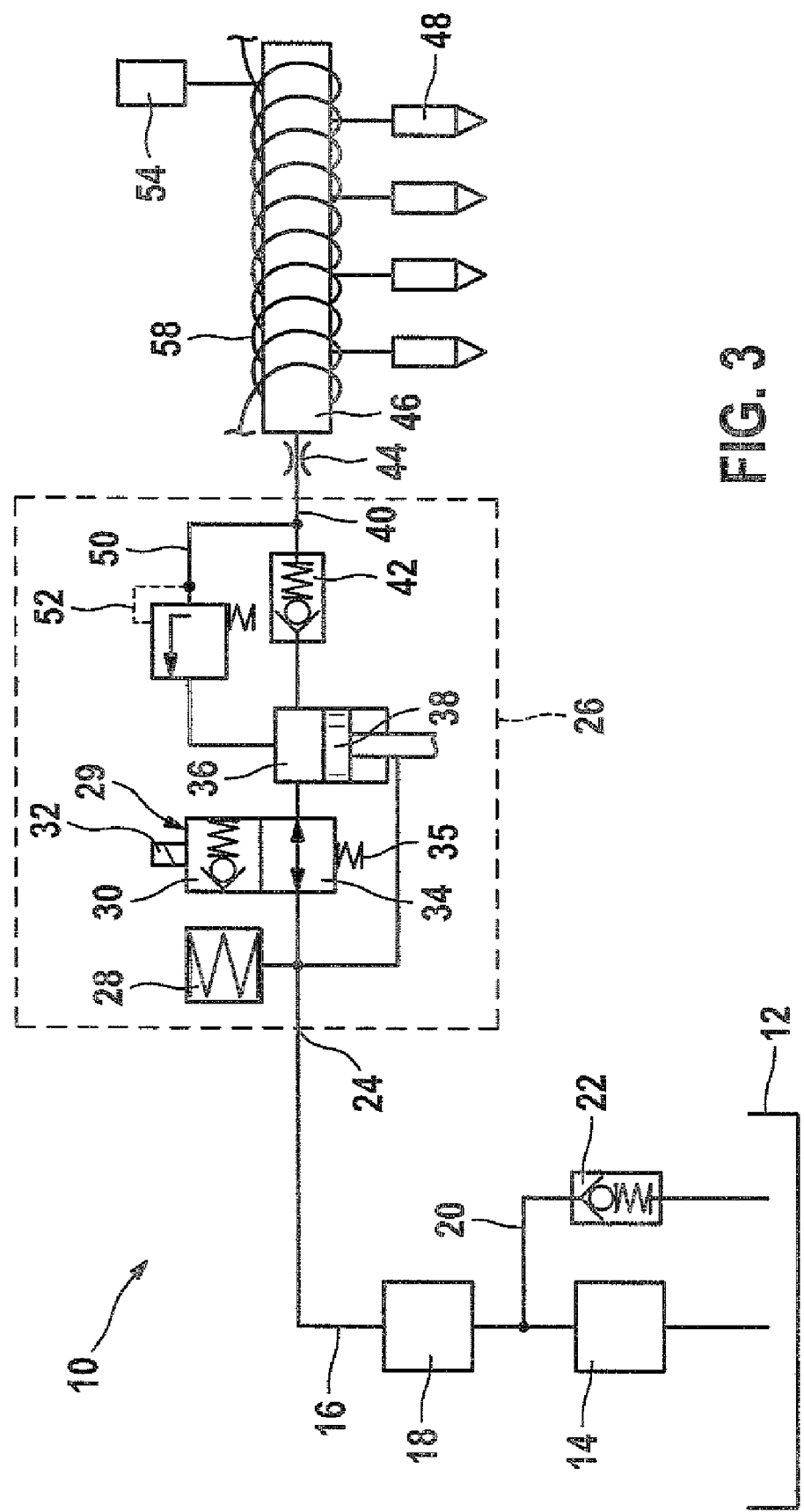
FIG. 3 is a depiction similar to FIG. 1 of an alternative embodiment of a fuel system embodying the invention.

FIG. 3 shows an alternative embodiment in which functionally equivalent elements and regions are provided with the same reference numerals. In the fuel system 10 in FIG. 3, the heater 58 is situated at the fuel rail 46.

The foregoing relates to preferred exemplar embodiments of the invention, it being understood that other variants and embodiments thereof are possible within the spirit and scope of the invention, the latter being defined by the appended claims.

We claim:

1. A fuel system for an internal combustion engine, comprising a delivery unit, a pressure region downstream of the delivery unit into which the delivery unit feeds, at least one heater, and a control means for automatically activating the heater when the delivery unit is switched off to heat fuel present in the pressure region so that the pressure in the pressure region does not fall below a limit pressure or rises back to a pressure above a limit pressure.

2. The fuel system according to claim 1, further comprising a low-pressure region and a high-pressure region, at least one heater situated in the low-pressure region, preferably in the inlet into a high-pressure pump.

3. The fuel system according to claim 1, further comprising a low-pressure region and a high-pressure region, and at least one heater is situated in the high-pressure region, preferably at a fuel rail.

4. The fuel system according to claim 2, further comprising a low-pressure region and a high-pressure region, and at least one heater is situated in the high-pressure region, preferably at a fuel rail.

5. The fuel system according to claim 1, wherein the heater includes an electric heating wire.

6. The fuel system according to claim 1, wherein the control means is embodied so that it activates the heater in a cyclical fashion.

7. The fuel system according to claim 1, wherein the control means is embodied so that at least one activation parameter of the heater, in particular an activation time, a duration until a first activation, an activation duration, a pause time between two activated phases, and/or a voltage corresponding to a heating capacity, depends at least some of the time on at least one operating variable of the fuel system, in particular the signal of a fuel pressure sensor and/or a temperature sensor, a modeled fuel pressure, and/or a modeled temperature.

8. The fuel system according to claim 7, wherein the control means is embodied so that the activation parameter is determined at or immediately after the switching off of the delivery unit and/or the engine.

9. The fuel system according to claim 7, wherein the control means is embodied so that the activation parameter is determined before or at the starting of the delivery unit and/or the engine.

10. The fuel system according to claim 7, wherein the control means is embodied so that at least one operating variable of the fuel system, in particular a pressure or a temperature or a corresponding variable, is compared to a limit value and the activation parameter is determined and/or an actuation is carried out as a function of the comparison result.

11. The fuel system according to claim 8, wherein the control means is embodied so that at least one operating variable of the fuel system, in particular a pressure or a temperature or a corresponding variable, is compared to a limit value and the activation parameter is determined and/or an actuation is carried out as a function of the comparison result.

12. The fuel system according to claim 9, wherein the control means is embodied so that at least one operating variable of the fuel system, in particular a pressure or a temperature or a corresponding variable, is compared to a limit value and the activation parameter is determined and/or an actuation is carried out as a function of the comparison result.

13. The fuel system according to claim 10, wherein the control means is embodied so that the comparison is carried out at predetermined intervals.

14. The fuel system according to claim 11, wherein the control means is embodied so that the comparison is carried out at predetermined intervals.

15. The fuel system according to claim 12, wherein the control means is embodied so that the comparison is carried out at predetermined intervals.

16. The fuel system according to claim 10, wherein the control means is embodied so that the comparison is carried out at intervals that depend on at least one operating variable of the fuel system.

17. The fuel system according to claim 11, wherein the control means is embodied so that the comparison is carried out at intervals that depend on at least one operating variable of the fuel system.

18. The fuel system according to claim 12, wherein the control means is embodied so that the comparison is carried out at intervals that depend on at least one operating variable of the fuel system.

19. The fuel system according to claim 1, wherein the control means is embodied so that at least one activation parameter of the heater, in particular an activation time, a duration until a first activation, an activation duration, a pause time between two activated phases, and/or a heating capacity, is predetermined in a fixed fashion.

20. The fuel system according to claim 1, wherein the control means is integrated into a device that is separate from an engine management system.

* * * * *